(12) United States Patent
Göbel

(10) Patent No.: US 10,913,193 B2
(45) Date of Patent: Feb. 9, 2021

(54) TOPOLOGICALLY STRUCTURED COMPONENT PANEL AND METHOD FOR PRODUCING THE SAME

(71) Applicant: Adval Tech Holding AG, Niederwangen (CH)

(72) Inventor: Markus Göbel, Hochdorf (CH)

(73) Assignee: ADVAL TECH HOLDING AG, Niederwangen (CH)

( * ) Notice: Subject to any disclaimer, the term of this patent is extended or adjusted under 35 U.S.C. 154(b) by 380 days.

(21) Appl. No.: 15/767,440

(22) PCT Filed: Oct. 11, 2016

(86) PCT No.: PCT/EP2016/074300
§ 371 (c)(1),
(2) Date: Apr. 11, 2018

(87) PCT Pub. No.: WO2017/064040
PCT Pub. Date: Apr. 20, 2017

(65) Prior Publication Data
US 2018/0304509 A1    Oct. 25, 2018

(30) Foreign Application Priority Data

Oct. 12, 2015 (EP) .................................. 15189263

(51) Int. Cl.
*B29C 45/37* (2006.01)
*B29C 45/76* (2006.01)
(Continued)

(52) U.S. Cl.
CPC ........ *B29C 45/372* (2013.01); *B29C 45/7693* (2013.01); *B60H 1/3407* (2013.01); *B29C 33/405* (2013.01); *B29C 45/1676* (2013.01)

(58) Field of Classification Search
CPC .................................................. B29C 45/372
See application file for complete search history.

(56) References Cited

U.S. PATENT DOCUMENTS

| 2010/0035078 A1 | 2/2010 | Staudt et al. |
| 2010/0233428 A1 | 9/2010 | Stone et al. |

FOREIGN PATENT DOCUMENTS

| CN | 201660977 U | 12/2010 |
| EP | 0 569 192 A1 | 11/1993 |

OTHER PUBLICATIONS

International Search Report for PCT/EP2016/074300, dated Jan. 26, 2017.

*Primary Examiner* — Larry W Thrower
(74) *Attorney, Agent, or Firm* — Sughrue Mion, PLLC

(57) ABSTRACT

A description is given of a component (1) having at least one area of plastic (3, 21), which extends with the surface (32) thereof that is facing a front side (28) along a reference plane (22). The component is characterized in that, in this area of plastic (3, 21), the wall of plastic (27) has a wall thickness (d) in the range of 0.2-5 mm, in this area of plastic (3, 21) there is formed a continuous two-dimensional grid (30) of channel-shaped depressions (6), in which depressions (6) the wall of plastic (27), while keeping substantially the same wall thickness (d), is offset out of the reference plane (22) by an offset (v) and, perpendicularly to the reference plane (22), in the depressions (6) the offset (v) lies in the range of 1.5 to 5 times the wall thickness (d) from the reference plane (22) to the surface (32) of the rear side (29), wherein the grid (30) forms a pattern comprising a multiplicity of grid cells (31) recurring in two directions of the reference plane (22).

29 Claims, 7 Drawing Sheets

(51) Int. Cl.
  *B60H 1/34* (2006.01)
  *B29C 45/16* (2006.01)
  *B29C 33/40* (2006.01)

TOPOLOGICALLY STRUCTURED COMPONENT PANEL AND METHOD FOR PRODUCING THE SAME

CROSS REFERENCE TO RELATED APPLICATIONS

This application is a National Stage of International Application No. PCT/EP2016/074300 filed Oct. 11, 2016, claiming priority based on European Patent Application No. 15189263.5, filed Oct. 12, 2015.

TECHNICAL FIELD

The present invention relates to a plastics material component having at least one component portion which is located in a plane and which has a regular two-dimensional rib pattern with deviations from the mentioned plane (topological structuring). Furthermore, the invention relates to methods for producing such components and uses of such components, in particular as structural components in the vehicle sector, for example, air guiding elements in the engine of motor vehicles.

PRIOR ART

The production of components such as, for example, housings, covers, guiding elements, etcetera, from thermoplastic plastics material, for example, using an injection-molding method, has been known for some time. In particular in the automotive sector, such plastics material components are increasingly replacing metal components, on the one hand, as a result of the currently excellent mechanical properties, even at high temperatures or low temperatures, which are provided by modern thermoplastic plastics materials, whether it be polyolefin or polyamide, for example, but, on the other hand, also as a result of the significantly lower weight of the plastics material components compared with metal. Depending on the application, such components have to withstand different loads at different temperatures; they must above all, for example, in the automotive sector have good bending moments and a high level of impact resistance which is constant over large temperature ranges. In terms of production technology, it is currently challenging but possible also to successively construct such components in flexible production processes from different materials; hard regions may thus be constructed, for example, on the basis of polyolefin in a first step in the mold, the mold can then be expanded and subsequently in a second step a soft region can be formed, for example, based on thermoplastic elastomer materials.

It is always a challenge in this instance, with the lowest possible weight, or with a small wall thickness, and consequently low costs, to provide the highest possible quality of component, that is to say, one also with good mechanical properties under extremely different temperature and moisture conditions.

STATEMENT OF INVENTION

It is accordingly inter alia an object of the present invention to provide an improvement for such components, that is to say, components of plastics material which have good mechanical properties (above all rigidity and flexural resistance) but which are nonetheless as light as possible and can be produced in a simple manner.

The present invention consequently relates inter alia to a component according to claim 1 or the associated dependent claims, a method for producing such a component according to claim 12. Furthermore, however, the present invention also relates to a method for configuring an injection-molding mold or thermo shaping mold according to claim 13 for producing such a component or for use in such a production method, and uses of such components.

Accordingly, the present invention relates inter alia to a component having at least one plastics material region which extends with the surface thereof facing a front side along a reference plane and which is topologically structured. The plastics material region characterized in that in this plastics material region the plastics material wall has a wall thickness d in the range from 0.2 to 5 mm, preferably in the range from 0.5 to 3 mm or from 0.7 to 0.9 mm. Furthermore, there is formed in this plastics material region a coherent two-dimensional grid of channel-like recesses, in which the plastics material wall of this region with the wall thickness d remaining substantially the same is offset out of the reference plane by an offset v. This offset v is intended to be understood to be perpendicular to the reference plane and from the reference plane to the surface of the rear side in the recesses and is in the range from 1.5 to 5 times the wall thickness d, preferably in the range from 2 to 4 times or 2.5 to 3.5 times the wall thickness. The grid forms in this instance a pattern with a multitude of grid cells which are repeated in two directions of the reference plane.

In the context of this invention, a channel-like recess is intended to be understood to be a zone which is formed when viewed from a front side and which is constructed to be recessed with respect to a reference plane and which forms a corresponding rib on the rear side. Such a channel-like recess is thus not simply a channel-like recess in one surface which does not influence the rear side, but instead forms on the rear side a corresponding rib which is a result of the fact that the material thickness over the channel-like recess remains substantially constant.

The wall thickness d of the plastics material layer in the topologically structured region is intended to be understood to be the thickness measured perpendicularly to the surface plane at the corresponding location. Since the material thickness over the topological structure is substantially constant, the surface at the front side and the surface at the rear side generally also extend in a parallel manner.

The reference plane mentioned is the plane which is defined by the highest points of the protrusions at the front side. The reference plane is a planar plane, but may also be slightly curved under some circumstances.

The offset v mentioned is the spacing from the location of the surface redirected to the greatest extent with respect to the rear side in the region of the recesses with respect to the reference plane. In actual fact, the locations redirected to the greatest extent with respect to the rear side on the surface of the rear side define a plane which is located substantially parallel with the reference plane. This plane has a spacing v with respect to the reference plane.

A grid in this context is a geometric grid preferably in the sense of a gap-free and overlap-free partition of a region of the plane by a quantity of grid cells. The grid cells are defined by a quantity of grid locations which are connected to each other by means of a quantity of grid lines and which form grid elements.

This topologically structured surface can, on the one hand, be readily produced, leads to improved mechanical values, in particular bending moments, leads to an improved flow of air on the surface, to an appealing appearance and feel and other advantages.

According to a first preferred embodiment, such a component is characterized in that the grid cells are selected from the group of polygons, that is to say: triangles, preferably equilateral triangles; quadrilaterals, preferably squares, rectangles, rhombuses, lozenges; pentagons, preferably equilateral pentagons; hexagons, preferably equilateral hexagons, octagons, preferably equilateral octagons; or a combination of these elements.

According to another preferred embodiment, the grid cells have an at least two-fold rotational symmetry. Preferably, they have a 2, 3, 4, 5, 6 or 8-fold rotational symmetry, particularly preferably a 6-fold rotational symmetry.

Preferably, for the construction of the grid there is only a single grid cell which is constructed in an identical manner over the entire grid. Thus, for example, the grid line is preferably a regular hexagon which leads to the formation of a honeycomb structure as a grid.

The side length of the grid cell is preferably in the range from 2 to 40 mm, preferably in the range from 3 to 30 mm, in particular in the range from 7 to 15 mm.

Preferably, the grid cell is constructed in an equilateral manner.

The grid cell is in a particularly preferred manner an equilateral hexagon, preferably with a hexagonal width across flats k (spacing of the parallel sides) in the range from 15 to 25 mm. This applies particularly preferably with a plastics material wall thickness d in the range from 0.5 to 1.1 mm, preferably in the range from 0.7 to 1 mm.

The wall thickness d of the topologically structured region is preferably in the range from 0.5 to 1.1 mm, preferably in the range from 0.7 to 1 mm.

According to another preferred embodiment, the wall thickness d in the entire plastics material region, with the exception of a deviation of less than 5%, preferably of less than 2%, is identical over the undulation.

The recesses are preferably with respect to their concave construction when viewed from the front side constructed in a rounded manner, preferably with radii of curvature in the range from 2 to 10 mm, particularly preferably in the range from 3 to 7 mm.

According to another preferred embodiment, the recesses are with respect to the angled portions formed by corners of the grid cell constructed in a rounded manner, preferably with a radius in the range from 4 to 10 mm, in particular in the range from 5 to 7 mm.

The protrusion regions formed between the recesses are preferably, when viewed from the front side, constructed in a convex curved manner, wherein the center point which protrudes to the greatest extent with respect to the front side is preferably arranged in the region of the center of symmetry of the grid cell or on it.

At least the plastics material region preferably comprises a thermoplastic plastics material selected from the following group: polyolefin, polyamide, polycarbonate, polyester, polylactate, polyacrylate, polystyrene, polyvinyl, polyether or an admixture or a copolymer of these systems.

It is possible to consider, for example, systems selected from the following group acrylonitrile butadiene styrene (ABS), polyamide 6, polymethyl methacrylate (PMMA), polyethylene terephthalate (PET), polyethylene (PE), polypropylene (PP), polyetheretherketone (PEEK), polyvinyl chloride (PVC), or admixtures or copolymers of these systems.

In a particularly preferred manner, the plastics material region is constructed on the basis of polypropylene (PP), wherein it may have a significant proportion of filler, in particular talcum at a proportion of from 20 to 30% by weight.

The above-mentioned plastics materials may as mentioned contain fillers and/or reinforcement materials, preferably at a proportion of up to 60% by weight, preferably of up to 40% by weight, with respect to the entire molded mass. These fillers and/or reinforcement materials may preferably be selected from the group of reinforcement fibers, in particular glass fibers, carbon fibers, particulate, in particular mineral fillers, in particular talcum, chalk, glass balls, broken glass, calcium carbonate, and admixtures thereof.

In a further preferred manner, these plastics materials may contain additives and/or aggregates different from the mentioned fillers and/or reinforcement materials at a proportion of up to 20% by weight, preferably of up to 10% by weight, particularly preferably selected from the group of impact resistance modifiers, organic or inorganic pigments, carbon black, auxiliary demolding means, stabilizers, residues from the polymerization process, such as in particular catalysts, or admixtures thereof.

Furthermore, the present invention relates to such a component which is characterized in that the component in addition to the plastics material region has at least one additional region without topological structuring, wherein this is preferably an edge region of the component. This edge region may comprise the same material and have no topological structure. In place of or in addition to such an edge region of the same material, this additional region may preferably be produced from another plastics material, particularly preferably from an elastomer material at ambient temperature, particularly preferably from a thermoplastic elastomer material (TPE). Such a material may, for example, be selected from the following group: thermoplastic elastomers based on olefin, in particular PP/EPDM, cross-linked thermoplastic elastomers based on olefin, in particular PP/EPDM, thermoplastic elastomers based on urethane, thermoplastic polyester elastomers, thermoplastic copolyesters, styrol block copolymers, in particular SBS, SEBS, SEPS, SEEPS and MBS, thermoplastic copolyamides. Such an additional region may be injected directly on the topologically structured plastics material region or also adhesively bonded thereto.

The additional region may preferably comprise a TPE material and form at least one edge region of the component. For example, a combination of PP-T20 (polypropylene with 20% talcum) with an SEBS TPE material for the soft regions is preferable.

In a further preferred manner, the component may additionally have one or more securing element(s) by means of which the component can be secured to another workpiece, particularly preferably to a vehicle element. The component mentioned may be a portion or as a whole a component selected from the following group: housing, cover, shuttering, guiding element, in particular in the automotive sector, mobile telephone sector, electronic sector, electrical sector, railway sector, sporting goods sector, furniture sector. In a particularly preferred manner, it is an air guiding component and/or an air routing system in the automotive sector.

Furthermore, the present invention relates to a method, in particular a method for producing a component, as illustrated above. This method is characterized in that in a first step one (or more) hard component(s) of the component is/are constructed from a thermoplastic material in an injection-molding method or extrusion method, wherein either directly in this method step at least one region or the entire hard component is topologically structured by means of corresponding shaping of the mold (cavity), or in a subsequent method step the topological structuring is formed by means of thermal deformation (in a thermo shaping mold, thermal pressing mold). In a further preferred manner, additional regions, preferably of a different plastics material, particularly preferably of a thermoplastic elastomer material, can then be injected.

Furthermore, the present invention relates to a method for configuring an injection-molding mold or thermo shaping mold preferably for use in a method as set out above, and, for example, for producing a component, as set out above. This method is characterized in that starting from base elements whose upper regions predetermine the grid elements and which are constructed as conical polygonal truncated cones with conical side faces which are connected to each other by means of rounded curved edges, these base elements are arranged in accordance with the grid, preferably with respect to a honeycomb geometry base element which is similar to the grid element, and is formed in the plane of the transition from the upper region to the side faces, for example, with a spacing in the range from 3 to 10 mm, preferably in the range from 4 to 6 mm, and by the base elements being connected with a transition radius in order to form the geometry of the recesses, preferably with a radius in the range from 3 to 10 mm, preferably in the range from 4 to 6 mm and by the topologically structured boundary face formed in this manner being duplicated in order to form the cavity of the mold and being offset by the desired wall thickness perpendicularly to the plane.

Furthermore, the present invention relates to the use of a component as set out above as a housing, cover, shuttering, guiding element, in particular in the automotive sector, mobile telephone sector, electronic sector, electrical sector, railway sector, sporting goods sector, furniture sector, particularly preferably as an air guiding component and/or an air routing system in the automotive sector.

Other embodiments are set out in the dependent claims.

BRIEF DESCRIPTION OF THE DRAWINGS

Preferred embodiments of the invention are described below with reference to the drawings which serve merely as an explanation and which are not intended to be interpreted to be limiting. In the drawings.

DESCRIPTION OF PREFERRED EMBODIMENTS

Figure 1:
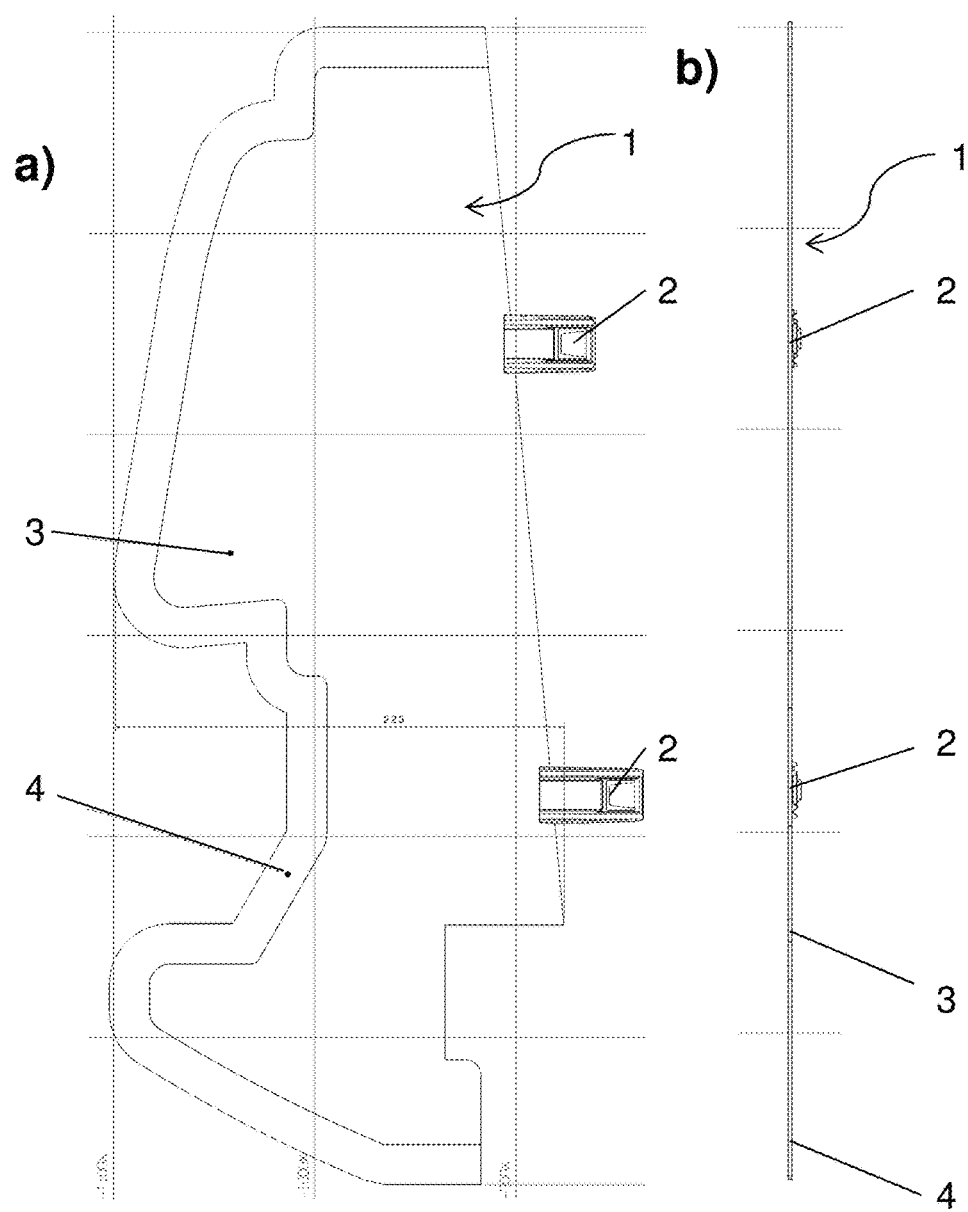
FIG. 1 shows views of an air guiding element for the automotive sector, wherein in a) a plan view, in b) a section and in c) a perspective illustration are depicted.

A plastics material air guiding element for the automotive sector is illustrated in FIG. 1 as an example of such a component 1. This is a plate in a plane (cf. FIG. 1b) and the plastics material component comprises a hard component 3 which at one edge has a rim 4 which moves into abutment with another component. The rim 4 comprises a soft component, for example, of a thermoplastic elastomer material. In this instance, PP-T20 was used as the material for the hard component and TPE-S, specifically an SEBS material, as a material for the soft component.

At the side opposite this rim 4 which is resilient at ambient temperature, securing elements 2, in this instance clip-fit connections for rapid assembly on another region of the carrier structure are provided.

Such air guiding elements are used in the context of the vehicle assembly in the engine compartment by them being clip-fitted by means of the securing elements 2, by being moved via an optionally additional flexible region between 2 different hard components into the correct position and subsequently being adjacent with the resilient region 4 to other components in this engine compartment.

Such an air guiding component, as the name suggests, guides the air in the engine compartment. It may in this instance be cooling air, but also another air flow.

Such air guiding elements have to be mechanically sufficiently stable, even at different temperatures, sometimes also very high temperatures, but on the other hand they are intended to be as light as possible in order to keep the overall weight of the vehicle low and consequently also the energy consumption thereof.

The air guiding element illustrated in FIG. 1 is constructed as a single plastics material plane for the hard region 3.

In order to comply with the requirements with regard to mechanical and thermal loading during such applications, such elements in the region of the hard components must have a material thickness of at least one millimeter. Even then, they have to be reinforced in most cases by means of linear parallel reinforcement ribs in the main loading directions.

Figure 2:
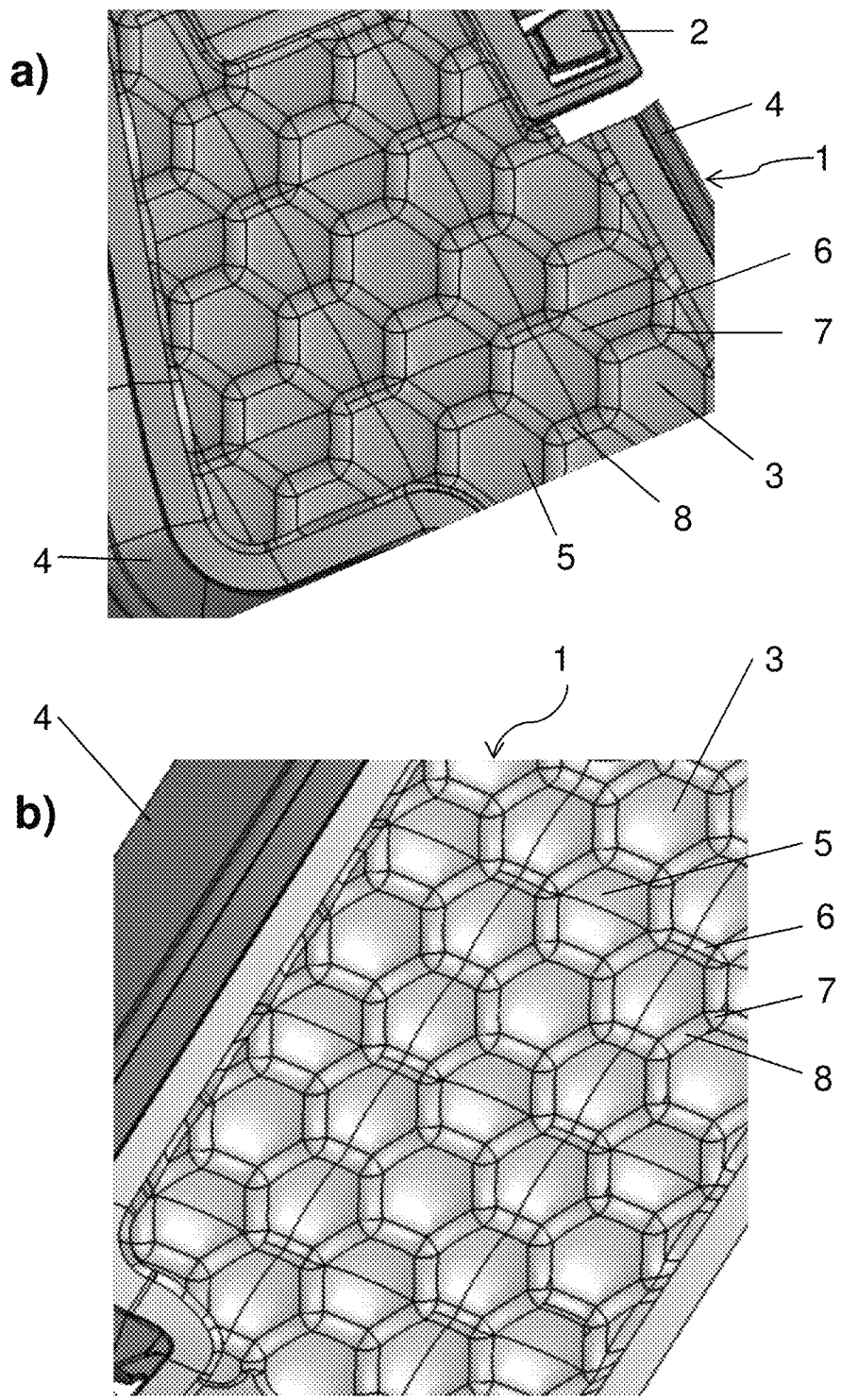
FIG. 2 shows views of an air guiding element with a honeycomb structuring, wherein in a) a perspective bottom view and in b) a perspective plan view are depicted.

According to the present invention, the hard component 3 is either completely or only in the decisive regions (for example, structured with the exception of a peripheral flat edge, as illustrated in FIG. 2) reinforced by means of a topological structuring. This structuring is illustrated when viewed from the rear side in FIG. 2a and from the front side in FIG. 2b. The topological structuring, based on hexagonal base elements, is constructed as a grid 30 of recesses 6 which in each case delimit a projection region 5 in a peripheral manner. The recesses 6 form a geometric grid 30 and have straight side portions 8 and intersection regions 7 which connect them. The wall thickness (perpendicular to the plane of the component) is substantially identical over the topology, that is to say, the boundary face at the front side and the one at the rear side are substantially identical, they are simply displaced by the wall thickness d perpendicularly to a reference plane of the component.

This topological structuring enables the wall thickness of such a component 1 to be significantly reduced, whereby weight and costs can be saved. At the same time, the significant advantage is afforded compared with conventional reinforcement ribs that the reinforcement action of such a regular two-dimensional grid provides an increase of the bending moment in a substantially homogeneous manner in all spatial directions and not as in conventional linear ribs where only the bending moment in one direction perpendicular to the rib is increased. In particular with the component described in this instance, it is important since with different loads and temperatures, different bending moments in different directions can also occur and can thus be absorbed in an optimum manner.

In addition, as a result of the topological structuring of the surface, the advantage is also afforded that the flow relationships at the surface are improved. There is furthermore a pleasant feel and appearance.

Figure 3:
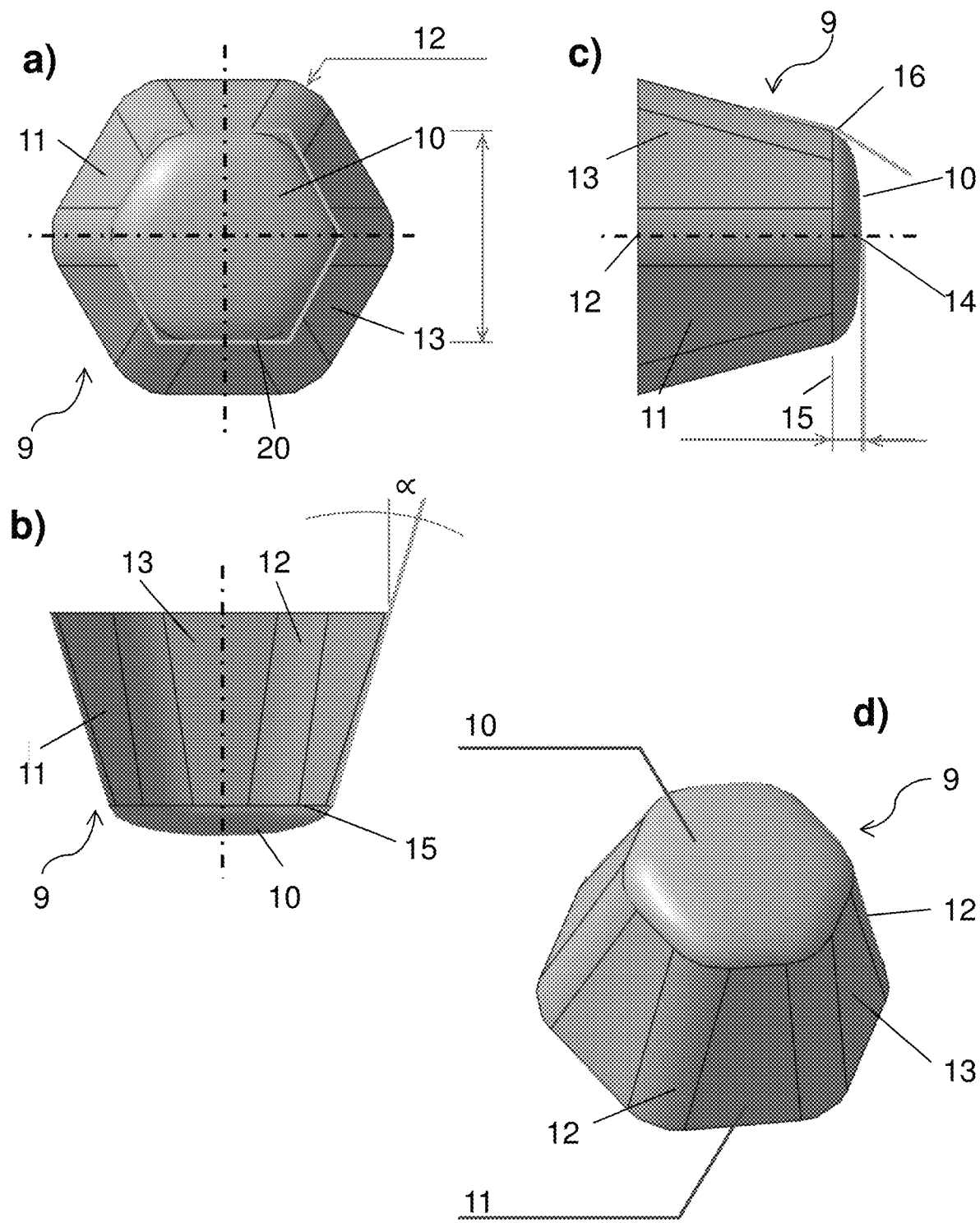
FIG. 3 shows the definition and the main dimensions of the base element, wherein in a) a plan view, in b) and c) a first and second side view and in d) a perspective illustration are depicted.

In order also to be able to configure such a mold for the production process, without the quantities of data for the mold becoming boundless and the design process highly complex, a method can be used as is intended to be described with reference to FIGS. 3 and 4.

The starting point in this structure of the topological honeycomb structure of the topologically structured region of the surface of the component is a multitude of identical base elements 9. These base elements 9 are constructed as conical truncated cones which determine in the cone termination plane 15 a honeycomb geometry base element 20 in the form of a hexagon 20. This equilateral hexagon 20, for example, with a width across flats K of 21 mm, is predetermined and in a following step the corners of this equilateral hexagon 20 are rounded with a radius, for example, with a radius of 6 mm. The side face of the cone 11 which forms the peripheral cover is inclined with respect to the main axis of the truncated cone through the angle α, α is, for example, 15 degrees. With the cone side face 11, planar portions 13 are connected to each other by means of curved edges 12 which may be formed for example, with a radius of curvature of 6 mm. The individual planar portions 13 of the entire cone side face 11 are thus connected to each other via the curved edge surface elements 12.

The cover face 10 is constructed with a tangential transition 16 to the cone side face 11 and is also constructed in a convex rounded manner toward the upper side. At the center point 14 of this cover face 10, there is a camber relative to the cone termination plane 15, for example, of 3.5 mm. These virtual base elements 9 serve to determine the topology of the boundary face for the injection-molding mold and constitute the basis for the grid which is intended to be produced.

Figure 4:
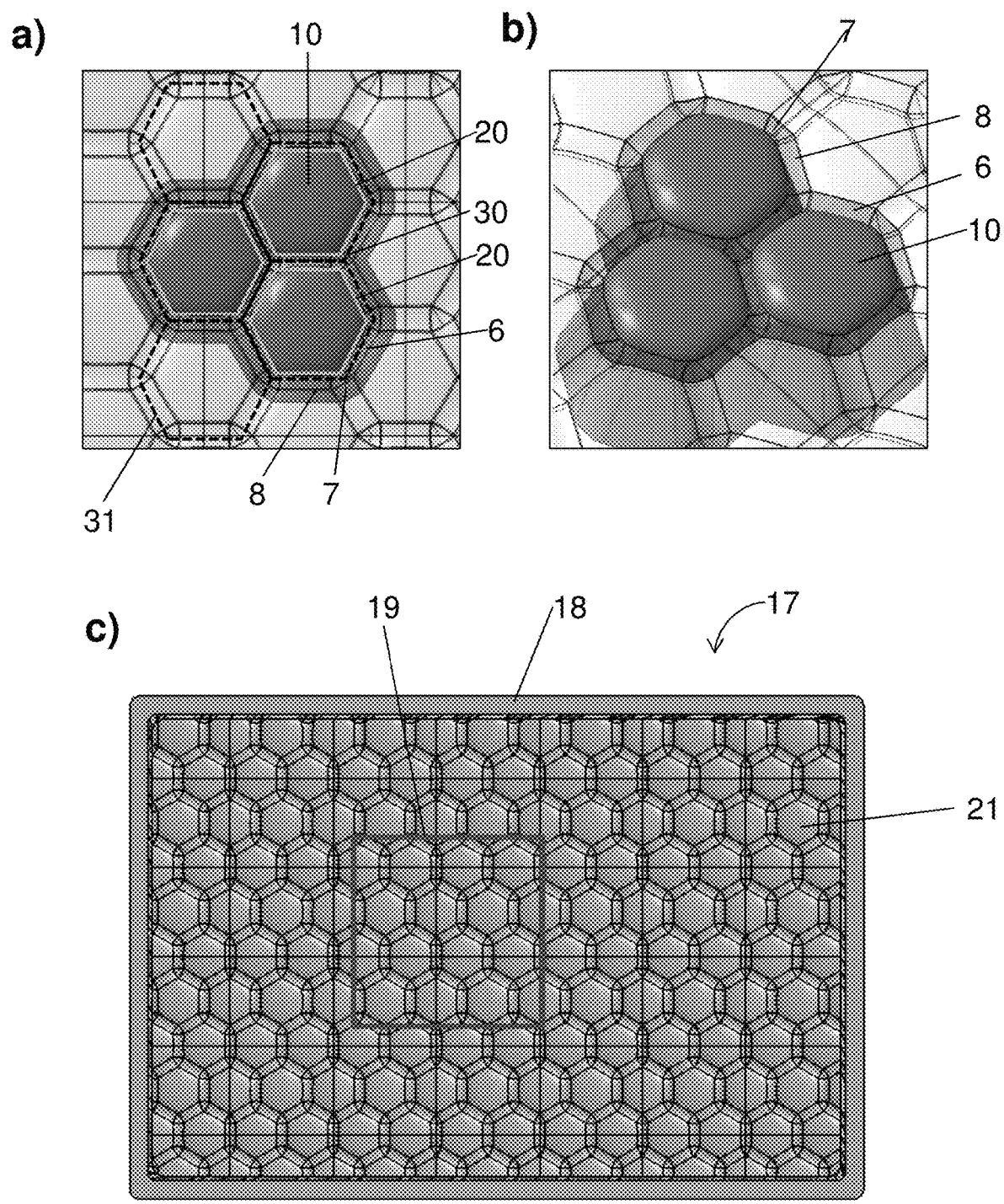
FIG. 4 is an illustration of the component configuration, wherein in a) a cut-out as a plan view and in b) a perspective illustration with the base elements in accordance with the square in c) is depicted.

FIG. 4 illustrates how, from these base elements 9, the actual surface is constructed. The base elements 9 are arranged beside each other in accordance with the honeycomb pattern, wherein the hexagon 20 is arranged in each case at a spacing of 5 mm with respect to the adjacent hexagon. Subsequently, a convex rounded plane with a radius of, for example, 5 mm, is placed between adjacent base elements or between the adjacent rounded hexagons of the adjacent base elements. The recesses which extend in each case around the protrusions are thus formed.

The grid 30 which is formed in this manner from the grid cells 31 thus takes up the honeycomb geometry element 20 of the base element 9, but has a greater grid constant, this increase is predetermined by the spacing between the base elements 9.

The boundary plane defined in this manner can now be duplicated and offset by the desired material thickness of the resulting component perpendicularly to the reference plane of the surface. The two boundary planes produced in this manner define the cavity of the tool and can as a result of the predetermined rounded portions also readily be produced in technical production terms and also do not give rise to any problems in technical injection-molding terms with respect to molding and removal from the mold.

Figure 5:
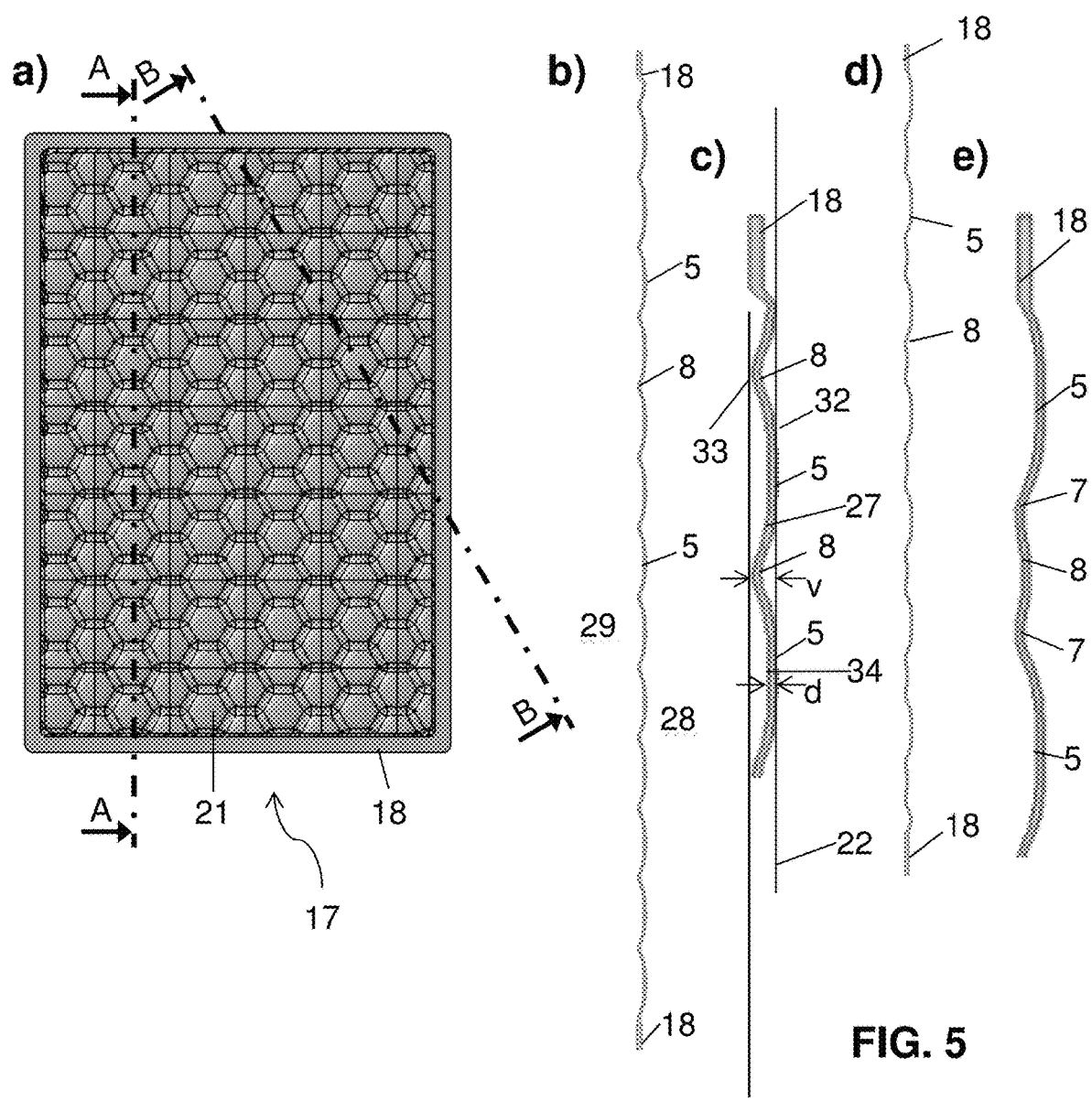
FIG. 5 shows detailed illustrations of a reference plate with a structured plane, wherein in a) the plate is illustrated as a plan view, in b) a section along the line A-A in a) is illustrated, in c) the section of b) in the end region is illustrated with enlargement, in d) the section along the line B-B in a) is illustrated, and in e) the section of d) in the end region is illustrated with enlargement.

In FIG. 5, a reference plate which is produced using such a topology is illustrated with a honeycomb structure. The reference plate has in this instance a peripheral edge 18. The thickness in the edge region is 1.5 mm but in the topologically structured region 21 is only 0.8 mm.

The sectioned illustrations according to b)-e) show how this topologically structured surface at the front side 28 has the mentioned protrusions 5. The surface 32 of this front side 28 defines in each case center points 34 of the protrusion regions. These center points represent the maximum deviation toward the front side 28 and define a reference plane 22. The reference plane 22 is accordingly defined by these center points 34.

The recesses 6 at the other side, such as, for example, as illustrated in FIG. 5c, the side portion 8, also form on the rear side 29 of the structured plate with the surface 33 at that location locations of maximum redirection, that is to say, the lowest locations 35 of the rear-side surface 33, the spacing of these lowest locations 35 of the rear-side surface with respect to the reference plane 22 is intended to be understood to be the offset v.

It can also be seen in this Figure how the material thickness in the topologically structured region, indicated with the reference numeral d, is substantially identical over the entire topologically structured region and in the embodiment is 0.8 mm. In the edge region 18, however, the thickness is greater and is the value of 1.5 mm mentioned. There is thus obtained a surface which undulates in a structured manner in two dimensions, and which can afford the mentioned advantages with respect to component stress and bending moments or component deformation characteristic values and surface properties.

Figure 6:
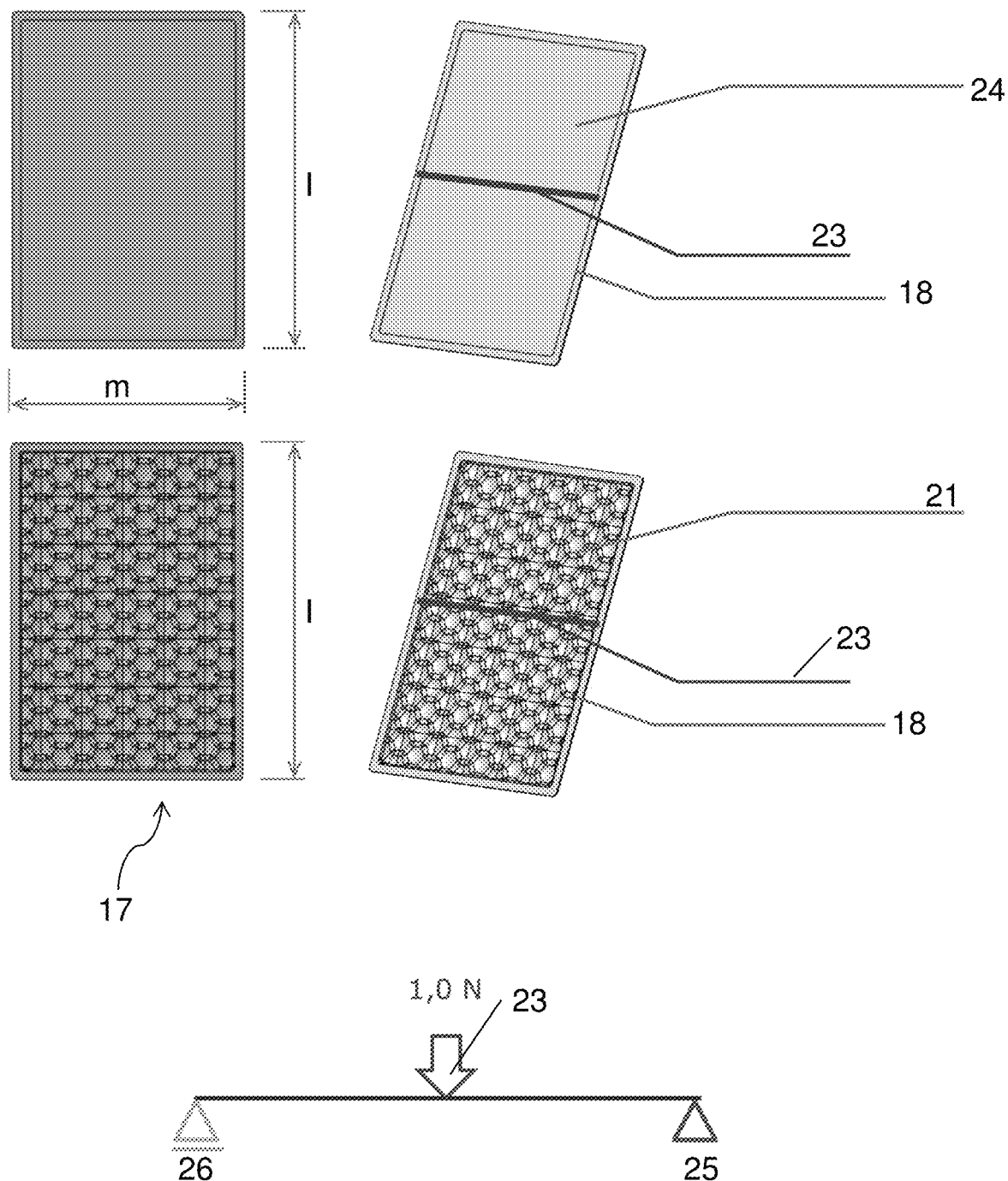
FIG. 6 shows the measurement arrangement (bottom) for a planar plate (top) and a plate with structuring (center)
Figure 7:
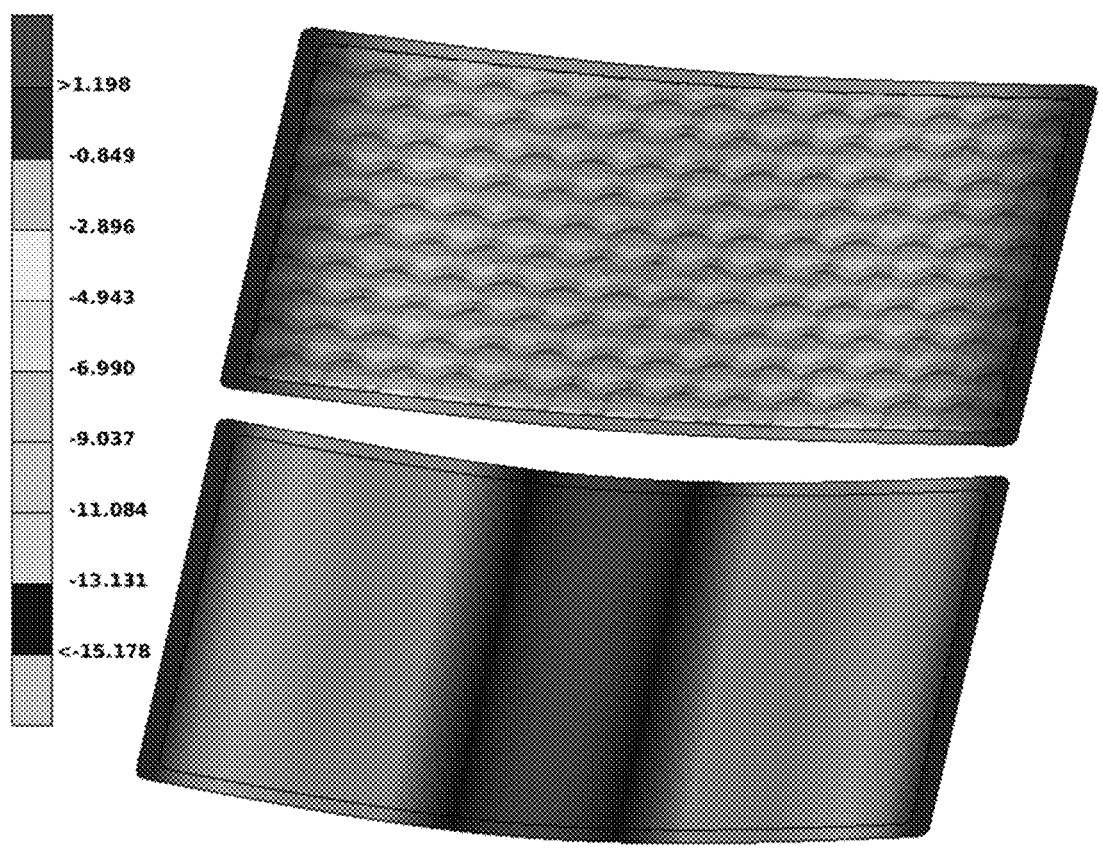
FIG. 7 shows the results of the component deformation provisions.
Figure 8:
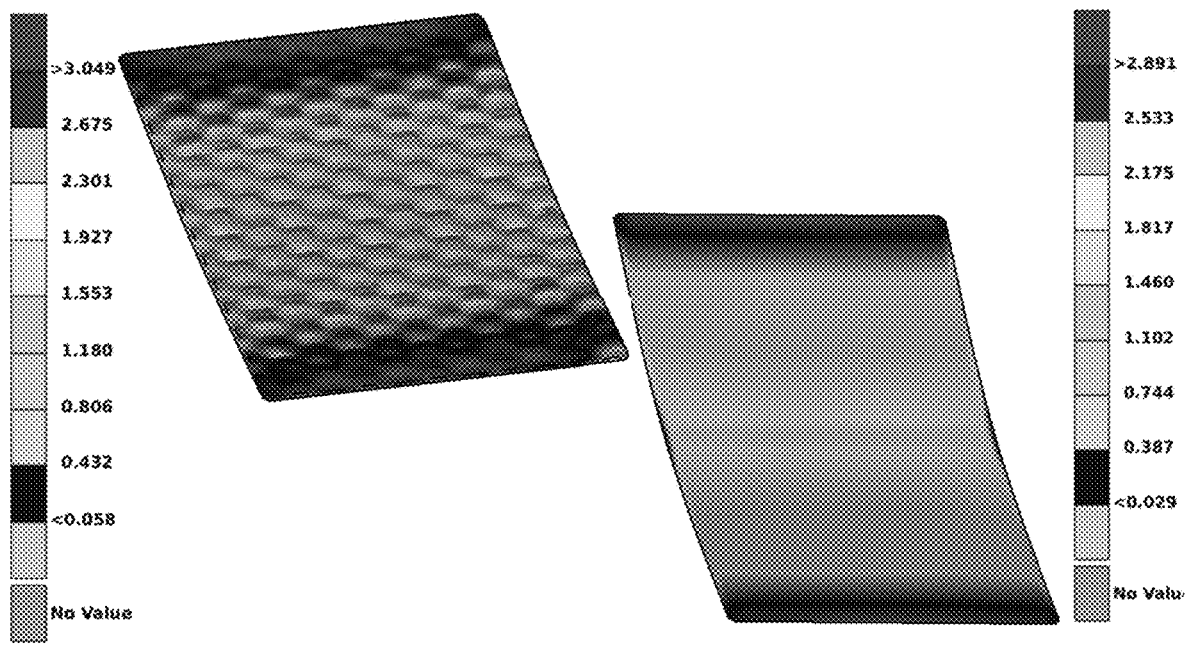
FIG. 8 shows the results of the component stress provisions.

In order to document the advantages, FIGS. 6 to 8 illustrate the corresponding calculations. There were examined using finite element calculations (FEM) reference plates of equal dimensions, that is to say, with a length 1 of 300 mm and a width m of 200 mm, in each case with a peripheral edge 18 of a material thickness of 1.5 millimeter and a width of 0.8 millimeter. Polypropylene T20 is stipulated as the material, that is to say, a polypropylene with 20 percent by weight of talcum as filler. The material thickness in the region inside the frame was stipulated as 0.8 mm. There was compared, on the one hand, a reference plate (in FIG. 6, illustrated at the top), in which the region located in the frame with a wall thickness of 0.8 mm was not structured, that is to say, formed a simple face.

This reference plate was compared with the plate illustrated at the bottom in FIG. 6 with a honeycomb structure, in which the structured region 21 was topologically structured as described above, and also had a material thickness of 0.8 mm.

In both cases, a line load 23 was now applied as illustrated in the two reference plate illustrations by the central transverse line and a line load of 1 Newton with respect to a fixed bearing 25 and a movable bearing 26 was applied (see FIG. 6 below).

In FIG. 7, the resulting component deformation is illustrated, at the top the component deformation in the case of the plate with the honeycomb structure and at the bottom the component deformation with the planar plate. In the case of the planar reference plate illustrated at the bottom, a deformation of more than 15 mm results whilst with the honeycomb structure illustrated at the top the deformation in the lowest region, that is to say, along the line with the line load, is in the region of 7 mm. The deformation may therefore be more than halved by the honeycomb structure and this reinforcement applies substantially identically in all directions in the plane of the plate, that is to say, it is substantially homogeneous in contrast to the conventional reinforcements with ribs or the like.

FIG. 8 shows the results for the component stress, in this instance with the honeycomb structure illustrated on the left, the maximum component stress is in the region of 1.5, whilst with the flat reference plate it is 2.5 mm.

It can thus be seen that the honeycomb structure can ensure a considerable improvement of the mechanical values which readily offsets the slight increase in weight as a result of the slightly higher volume of approximately 4%.

LIST OF REFERENCE NUMERALS

| | | | |
|---|---|---|---|
| 1 | Air guiding plate | 18 | Edge region of 17 |
| 2 | Securing element | 19 | Cut-out |
| 3 | Hard component | 20 | Honeycomb geometry base element |
| 4 | Soft component | | |
| 5 | Protrusion region | 21 | Structured region of 17 |
| 6 | Peripheral recess | 22 | Reference plane |
| 7 | Intersection region | 23 | Line load |
| 8 | Side portion | 24 | Non-structured region |
| 9 | Base element | 25 | Fixed bearing |
| 10 | Cover face | 26 | Movable bearing |
| 11 | Cone side face | 27 | Plastics material wall |
| 12 | Curved edge of 11 with radius 6 mm | 28 | Front side |
| | | 29 | Rear side |
| 13 | Planar portion of 11 | 30 | Grid |
| 14 | Center point of cover face | 31 | Grid cell |
| 15 | Cone termination plane | 32 | Surface of front side |
| 16 | Transition of cover face to cone side face | 33 | Surface of rear side |
| | | 34 | Center point protrusion region |
| 17 | Reference plate with honeycomb structure rear side at 6 | 35 | Lowest location of surface of |
| | | k | Hexagon width across flats, 21 mm |
| d | Plastics material wall thickness | l | Length of the reference plate, 300 mm |
| h | Height of center point over plane 15 | m | Width of the reference plate |
| | | v | Offset |
| | | α | Lateral inclination of the cone side face, 15° |

The invention claimed is:

1. A component having at least one plastics material region which extends with a surface thereof facing a front side along a reference plane,
    wherein in the plastics material region a plastics material wall has a wall thickness in a range from 0.2 to 5 mm,
    wherein in the plastics material region there is formed a coherent two-dimensional grid of channel-like recesses in which the plastics material wall is offset by an offset out of the reference plane with the wall thickness remaining substantially the same,
    wherein the offset perpendicular to the reference plane from the reference plane to a surface of a rear side with the recesses is in the range from 1.5 to 5 times the wall thickness,
    wherein the grid forms a pattern with a multitude of grid cells which are repeated in two directions of the reference plane.

2. The component as claimed in claim 1, wherein the grid cells are selected from the group consisting of: triangles, quadrilaterals;
    pentagons; hexagons, octagons; or a combination of these elements.

3. The component as claimed in claim 1, wherein the side length of the grid cell is in the range from 2 to 40 mm.

4. The component as claimed in claim 1, wherein the grid cell is an equilateral hexagon.

5. The component as claimed in claim 1, wherein the wall thickness is in the range from 0.5 to 1.1 mm
    and/or wherein the wall thickness in the entire plastics material region, with the exception of a deviation of less than 5%, is identical over the undulation.

6. The component as claimed in claim 1, wherein the recesses with respect to their concave construction when viewed from the front side are constructed in a rounded manner,
    and/or in that the recesses with respect to the angled portions formed by corners of the grid cell are constructed in a rounded manner.

7. The component as claimed in claim 1, wherein the protrusion regions formed between the recesses when viewed from the front side are constructed in a convex curved manner.

8. The component as claimed in claim 1, wherein at least the plastics material region comprises a thermoplastic plastics material selected from the following group:
    polyolefin, polyamide, polycarbonate, polyester, polylactate, polyacrylate, polystyrene, polyvinyl, polyether or an admixture or a copolymer of these systems.

9. The component as claimed in claim 1, wherein the component (1) in addition to the plastics material region has at least one additional region without topological structuring.

10. The component as claimed in claim 1, wherein it is a portion or as a whole a component selected from the following group: housing, cover, shuttering, guiding element.

11. The component as claimed in claim 10, wherein the additional region comprises a TPE material and forms at least one edge region of the component.

12. The component as claimed in claim 1, wherein the grid cells are selected from the group: squares, rectangles, rhombuses, lozenges; equilateral pentagons; equilateral hexagons, equilateral octagons; or a combination of these elements.

13. The component as claimed in claim 1, wherein the grid cells have an at least two-fold rotational symmetry.

14. The component as claimed in claim 1, wherein the grid cells have a 2, 3, 4, 5, 6 or 8-fold rotational symmetry.

15. The component as claimed in claim 1, wherein all the grid cells are substantially identical.

16. The component as claimed in claim 1, wherein the side length of the grid cell is in the range from 7 to 15 mm, wherein the grid cell is constructed in an equilateral manner.

17. The component as claimed in claim 1, wherein the grid cell is an equilateral hexagon, with a hexagonal width across flats (k) in the range from 15 to 25 mm, and with a plastics material wall thickness in the range from 0.7 to 1 mm.

18. The component as claimed in claim 1, wherein the wall thickness is in the range from 0.7 to 1 mm,
    and/or in that the wall thickness in the entire plastics material region, with the exception of a deviation of less than 2%, is identical over the undulation.

19. The component as claimed in claim 1, wherein the recesses with respect to their concave construction when viewed from the front side are constructed in a rounded manner, with radii of curvature in the range from 2 to 10 mm, or in the range from 3 to 7 mm,
and/or in that the recesses with respect to the angled portions formed by corners of the grid cell are constructed in a rounded manner, with a radius in the range from 4 to 10 mm, or in the range from 5 to 7 mm.

20. The component as claimed in claim 1, wherein the protrusion regions formed between the recesses when viewed from the front side are constructed in a convex curved manner, wherein the center point which protrudes to the greatest extent with respect to the front side is arranged in the region of the center of symmetry of the grid cell or on it.

21. The component as claimed in claim 1, wherein at least the plastics material region comprises a thermoplastic plastics material selected from the following group:
acrylonitrile butadiene styrene (ABS), polyamide 6, polymethyl methacrylate (PMMA), polyethylene terephthalate (PET), polyethylene (PE), polypropylene (PP), polyetheretherketone (PEEK), polyvinyl chloride (PVC), or admixtures or copolymers of these systems.

22. The component as claimed in claim 1, wherein at least the plastics material region comprises a thermoplastic plastics material containing fillers and/or reinforcement materials, at a proportion of up to 60% by weight, with respect to the entire molded mass.

23. The component as claimed in claim 1, wherein at least the plastics material region comprises a thermoplastic plastics material containing fillers and/or reinforcement materials, at a proportion of up to 40% by weight, with respect to the entire molded mass.

24. The component as claimed in claim 22, wherein the fillers are selected from the group of reinforcement fibers, including glass fibers, carbon fibers, particulate, including mineral fillers, including talcum, chalk, glass balls, broken glass, calcium carbonate, and admixtures thereof.

25. The component as claimed in claim 22, wherein these plastics materials further contain additives and/or aggregates different from the mentioned fillers and/or reinforcement materials at a proportion of up to 20% by weight, inclusive of those selected from the group of impact resistance modifiers, organic or inorganic pigments, carbon black, auxiliary demolding means, stabilizers, residues from the polymerization process, including catalysts, or admixtures thereof.

26. The component as claimed in claim 1, wherein the component in addition to the plastics material region has at least one additional region without topological structuring, wherein this is an edge region of the component and wherein this additional region can be produced from another plastics material, including an elastomer material at ambient temperature.

27. The component as claimed in claim 26, wherein the other plastics material is a thermoplastic elastomer material (TPE), selected from the following group:
thermoplastic elastomers based on olefin, including PP/EPDM, cross-linked thermoplastic elastomers based on olefin, including PP/EPDM, thermoplastic elastomers based on urethane, thermoplastic polyester elastomers, thermoplastic copolyesters, styrol block copolymers, including SBS, SEBS, SEPS, SEEPS and MBS, thermoplastic copolyamides,
wherein the additional region can be injected directly on the topologically structured plastics material region.

28. The component as claimed in claim 10, wherein the additional region comprises a TPE material and forms at least one edge region of the component,
wherein the component additionally has securing elements by means of which the component can be secured to another workpiece, including to a vehicle element.

29. The component as claimed in claim 1, wherein it is a portion or as a whole a component selected from the following group: housing, cover, shuttering, guiding element, in the automotive sector, mobile telephone sector, electronic sector, electrical sector, railway sector, sporting goods sector, furniture sector, including an air guiding component and/or an air routing system in the automotive sector.

* * * * *